Figure 1:
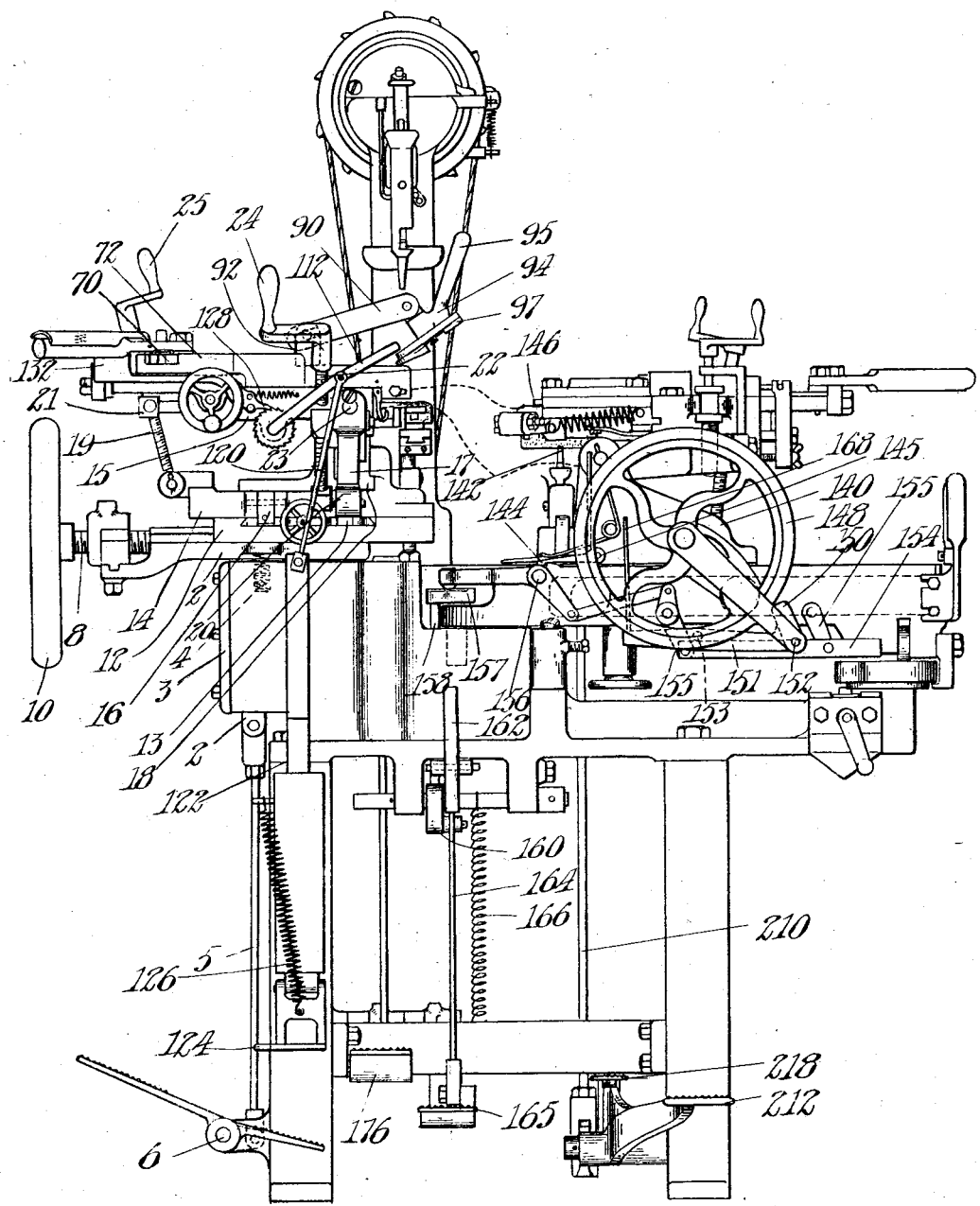

M. BROCK.
LASTING MACHINE.
APPLICATION FILED AUG. 14, 1909.

1,066,375.

Patented July 1, 1913.
10 SHEETS—SHEET 1.

M. BROCK.
LASTING MACHINE.
APPLICATION FILED AUG. 14, 1909.

1,066,375.

Patented July 1, 1913.
10 SHEETS—SHEET 2.

WITNESSES.
Elizabeth C. Coupe
Edith C. Holbrook

INVENTOR.
Matthias Brock
By his Attorney
Nelson W Howard

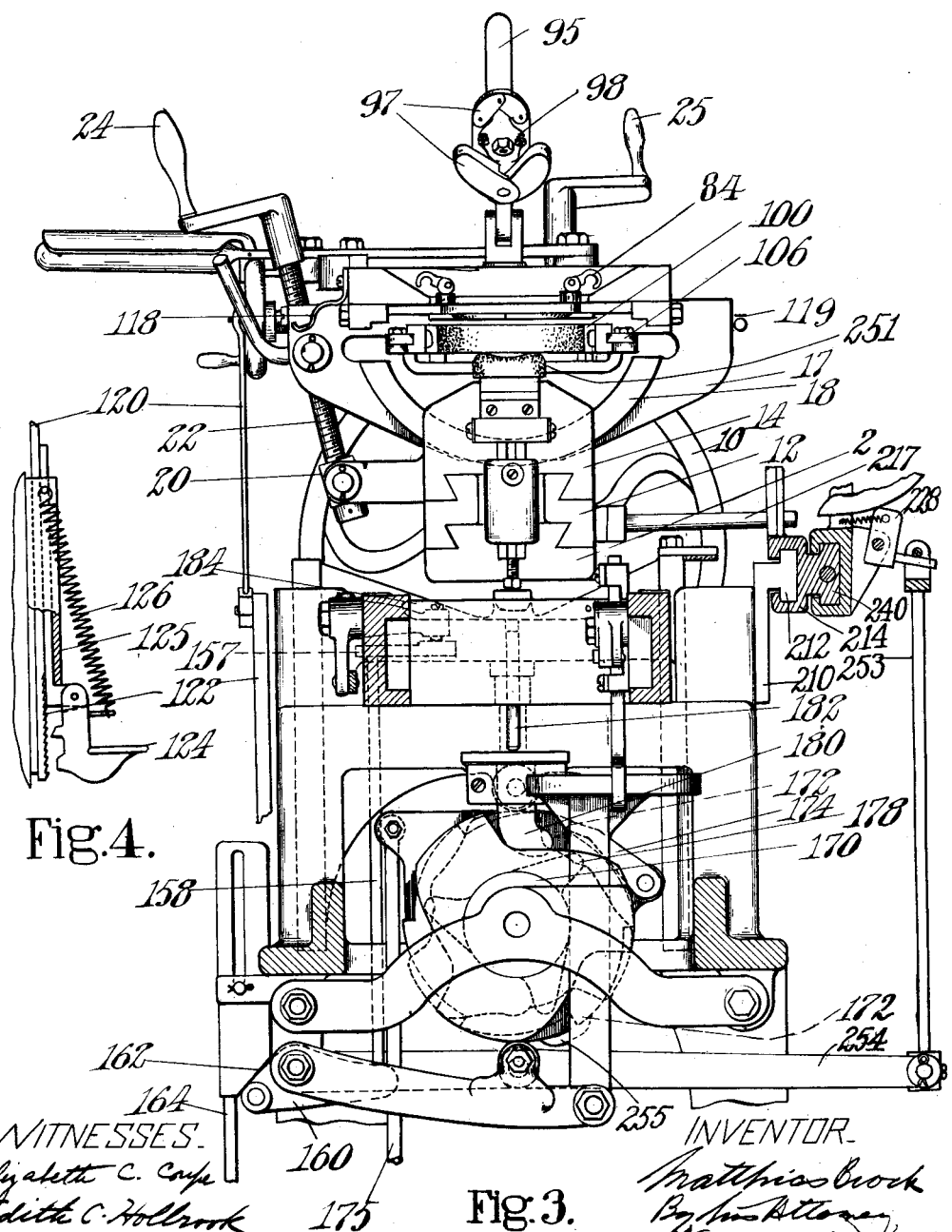

M. BROCK.
LASTING MACHINE.
APPLICATION FILED AUG. 14, 1909.

1,066,375.

Patented July 1, 1913.
10 SHEETS—SHEET 4.

WITNESSES.
Elizabeth C. Coupe
Edith C. Holbrook

INVENTOR.
Matthias Brock
By his Attorney
Nelson M Howard

M. BROCK.
LASTING MACHINE.
APPLICATION FILED AUG. 14, 1909.

1,066,375.

Patented July 1, 1913.

10 SHEETS—SHEET 5.

WITNESSES.
Elizabeth C. Coupe
Edith C. Holbrook.

INVENTOR.
Matthias Brock
By his Attorney,
Nelson M...

M. BROCK.
LASTING MACHINE.
APPLICATION FILED AUG. 14, 1909.

1,066,375.

Patented July 1, 1913.
10 SHEETS—SHEET 6.

M. BROCK.
LASTING MACHINE.
APPLICATION FILED AUG. 14, 1909.

1,066,375.

Patented July 1, 1913.
10 SHEETS—SHEET 8.

WITNESSES.
Elizabeth C. Coupe
Edith C. Holbrook

INVENTOR.
Matthias Brock
By his Attorney
Nelson W. Howard

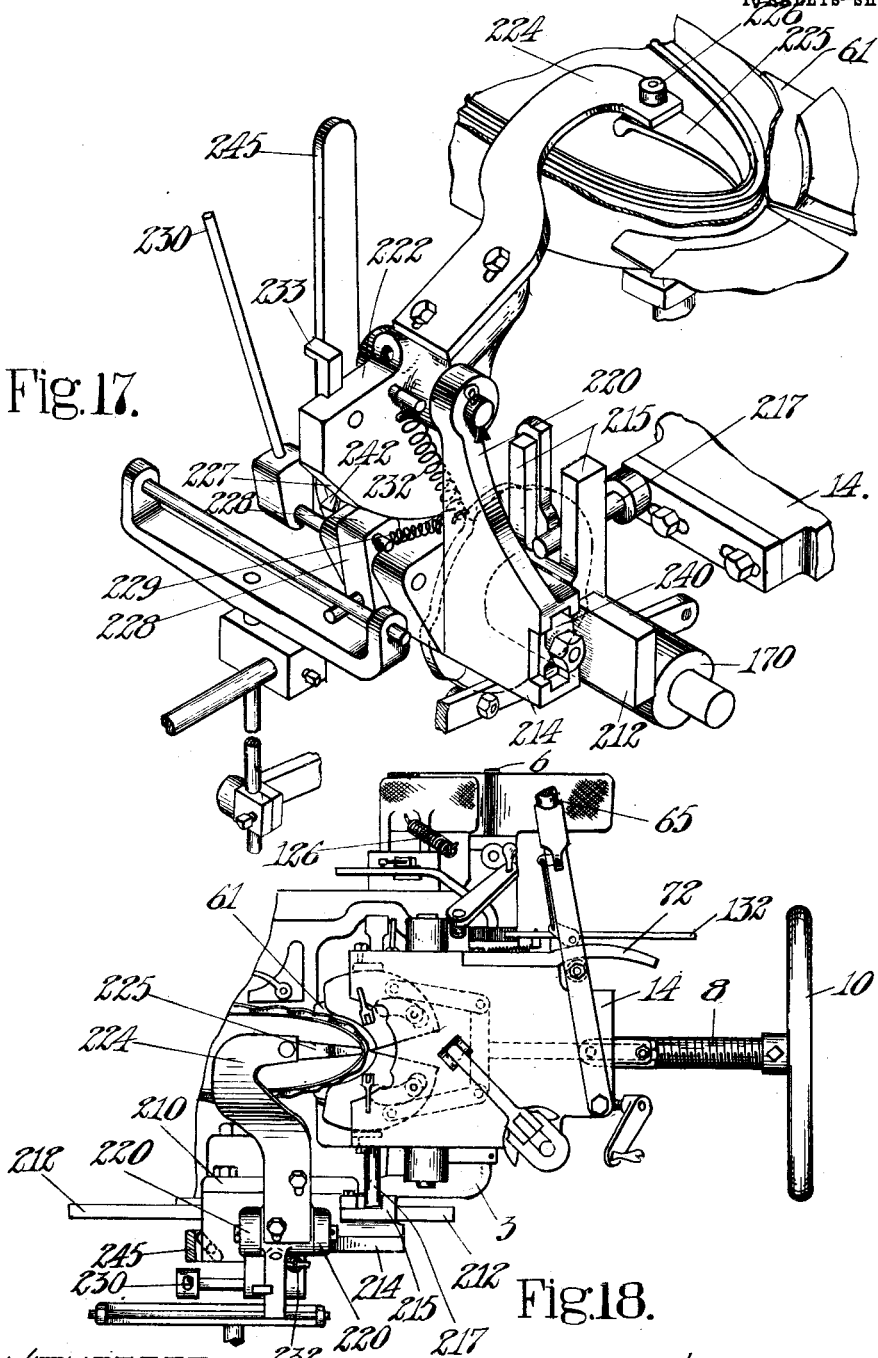

M. BROCK.
LASTING MACHINE.
APPLICATION FILED AUG. 14, 1909.

1,066,375.

Patented July 1, 1913.
10 SHEETS—SHEET 10.

WITNESSES

INVENTOR

UNITED STATES PATENT OFFICE.

MATTHIAS BROCK, OF BOSTON, MASSACHUSETTS, ASSIGNOR TO UNITED SHOE MACHINERY COMPANY, OF PATERSON, NEW JERSEY, A CORPORATION OF NEW JERSEY.

LASTING-MACHINE.

1,066,375.

Specification of Letters Patent. Patented July 1, 1913.

Application filed August 14, 1909. Serial No. 512,907.

*To all whom it may concern:*

Be it known that I, MATTHIAS BROCK, a citizen of the United States, residing at Boston, in the county of Suffolk and State of Massachusetts, have invented certain Improvements in Lasting-Machines, of which the following description, in connection with the accompanying drawings, is a specification, like reference characters on the drawings indicating like parts in the several figures.

This invention relates to lasting machines and is herein shown as embodied in a machine of the type described in United States Letters Patent No. 1,018,477, granted Feb. 27, 1912, on my prior application filed Oct. 26, 1907, and as comprising improvements in, modifications of, and additions to that machine suggested by experience in its commercial use, for the purpose of increasing its durability and efficiency and enlarging the capacity or output of the machine.

One important feature of this invention consists in the provision of a toe band adapted to coöperate with the usual wiper plates in conforming the upper generally to the toe portion of the last and particularly to assist in shaping the edge of the shoe at the junction of the side and bottom faces thereof. An important characteristic of this feature of the invention is found in the arrangement for actuating the toe band. This actuating mechanism is arranged to move the band from a retracted position below its normal working level and to effect this movement by raising the band to its working level before the band is advanced into position to embrace the shoe and to clamp the upper against the last. By this arrangement the band has only a clamping action upon the work and does not wipe upwardly over the work as has heretofore been the practice. One advantage of this arrangement is that in making shoes in which the upper consists of russet or other colored leathers the finish of the leather will not be injured by any frictional rubbing engagement of the band therewith. A further advantage is found in the fact that the top inner edge of the band, which is instrumental in forming the upper about the edge of the shoe, is not deformed or worn away as it would be if the band were used as a wiper. In the embodiment of the invention herein shown the toe band is used in combination with wipers between which and the last there is a relative movement perpendicular to the plane of the bottom face of the last for rubbing the upper upwardly along the sides of the last toward its edge. It is new so far as I am advised to provide, in a machine having this relative movement, a toe band which is arranged to come into engagement with the shoe only after the relative vertical movement of last and wipers to rub the upper upwardly has been completed. A further advantage of this construction, in the use which has been contemplated for it, is that the binding wire commonly employed for securing the upper about the toe of high grade shoes can be introduced between the wiper plates and the band when the latter is in its lowered position, and thereafter when the wipers have worked the upper into position to be secured, the binder can be drawn in under the wipers and then the band raised and advanced to its clamping position where it will hold the upper from slipping back while the wipers are raised to permit the wire to be seated in holding position.

A further feature of this invention is found in a novel construction of retarder or device arranged to coöperate with the wipers in gripping the upper and straining it so that the upper can be stretched about and conformed to the contour of the sides of the last by a pulling action as distinguished from a wiping action. The wiping action is to be avoided in making some colored shoes because of the liability of discoloring the upper leather or injuring its finish by the friction of the wipers against the leather. The retarder is shown as comprising a plate provided with relatively movable fingers adapted to conform to the shape and size of the particular shoe being lasted and to move and change contour with the wipers as the latter are advanced and closed in working the upper inwardly over the last bottom. This capacity of the retarder to adapt itself to the shape and width of the particular shoe and to change its contour in company with the wipers as they close is an important characteristic of this feature of the invention. The retarder is shown as including a plate carrying two sets of differently shaped fingers and adapted to be turned end for end to permit either set of fingers to be used according to the shape of shoe for which the fingers are best adapted.

The wipers are actuated over the shoe bottom by means of a hand lever as in the machine of the earlier mentioned patent. A novel means is provided for locking the lever to hold the wipers in the position to which they are advanced by it. This means comprises an eccentric clamping device arranged to engage a locking bar and actuated by a lever which constitutes a cover plate for the hand lever so that it can be readily operated by the same hand which is employed for moving the lever. This eccentric clamp has the advantage, over the construction heretofore used and which included a pawl and ratchet, that it will secure the lever in the exact position desired and that there are no teeth to become worn as do the ratchet teeth of the earlier construction. There is means for locking the toe band in raised and closed position and this locking means is arranged to be tripped by the wiper operating lever when the latter is swung backwardly to retract the wipers. The toe band is thus unlocked as an incident to the usual movement of the wiper lever and it is retracted by a spring provided for that purpose so that the use of the toe band involves a minimum of loss of time of the operator.

In order to incorporate the toe band and its actuating mechanism, above referred to, in the toe lasting head shown in said prior patent, it has been necessary to make some changes in the devices for supporting and adjusting the wipers and further features of this invention are found in novel arrangements for supporting the wipers to permit angular adjustment of the wipers transversely of the machine and by reason of which arrangements the wipers are substantially strengthened and prevented from springing as they sometimes do when heavily strained in the earlier constructions. In the construction shown in the main figures, the wiper carriage is provided with a depending yoke formed to permit the toe band supporting and actuating mechanism to be moved therethrough in proper relation to the wipers and this yoke is provided with a curved lower surface and a lateral rib arranged in a correspondingly shaped guideway in the head of the machine to permit adjustment of the wiper carriage about an axis approximately in the plane of action of the wipers. Other embodiments of this feature of the invention include a carriage arranged to permit the necessary movements of the toe band and supported at its opposite edges by links from a centrally pivoted transverse lever which is capable of adjustment to tip the wipers about an axis located as above suggested. In this latter construction the base, with relation to which the wipers and carriage are tipped, is provided with upstanding arms arranged to guide the wipers laterally and hold them firmly against the lateral thrusts which are incident to the use of the wipers in lasting shoes. In a further construction for providing lateral tipping movement of the wipers the arrangement employed in the prior commercial machines of this type and shown, substantially, in United States Letters Patent No. 552,834, has been modified to give greater rigidity to the wipers, particularly against upward yielding movement when they are pressed downwardly to shape the overworked upper upon the shoe bottom prior to fastening it by the binder. In this construction a tie bolt is provided which connects the base of the toe lasting mechanism with that sleeve of said patented machine which is turned for transversely adjusting the wipers. This tie bolt is provided with a head curved on its lower face to fit into the sleeve and is formed at its lower end with an eye to receive the transverse pivot shaft of the prior construction. By this arrangement the tie bolt holds the wipers and carrying devices from springing upwardly and offers no resistance to the usual movements of adjusting the wipers.

Another important feature of this invention is embodied in a downhold. This is arranged to serve several purposes. It restrains the last from rising at the toe end if the wipers are used to rub the upper upwardly along the side faces of the last. It holds the toe end of the innersole from being raised by the wipers by the stretching upper, and more important still it prevents the innersole from being crowded backwardly from the toe end of the last by the wipers as they advance for laying the upper over the last bottom. And further, the downhold may be connected with actuating means by which it can be employed for pushing the innersole forwardly upon the last bottom. In the preferred embodiment of this invention the downhold, although carried by a vertically stationary portion of the machine—as distinguished from the rising and falling toe lasting head of this type of lasting machine—is connected with the toe lasting head for movement therewith in adjustment for lasts of different lengths. This provides a constant normal relation, longitudinally of the machine, between the holddown and the wipers and other instrumentalities which act upon the toe portion of the shoe. The holddown is mounted at the side of the machine and is capable of being swung down upon the shoe bottom and means is provided for automatically locking the holddown in its depressed or operative position. This positioning and locking of the holddown may advantageously take place before the usual jacking operation of the machine in which the toe rest will lift the toe of the shoe against the downhold and effect automatically the clamping of the shoe between the rest and downhold. Provision is also made for automatically unlocking and returning the holddown to its starting position as a part of the unjacking operation of the machine. There is also provision for manually unlocking the holddown at any time during the operation of the machine and it will be moved away from the shoe automatically as soon as it is unlocked. An important feature of the holddown mechanism is found in means for actuating it lengthwise of the machine to move, or to apply forward pressure, to the innersole which is liable to be crowded backwardly from its normal position by the action of the wipers, whereas it is important in good shoemaking that the end of the innersole should be flush with the toe end face of the last.

A further feature of this invention consists in novel means for locking and releasing the hand wheel which is employed for forcing the heel post and the last thereon backwardly into the heel embracing band. This construction includes an eccentrically mounted friction locking device arranged to engage the periphery of the hand wheel instead of the pawl and ratchet connection heretofore employed. The locking device is connected by suitable intermediate devices with a treadle located adjacent to the treadle employed for unjacking the shoe. The relation of the treadle is such that the unjacking treadle may be first depressed with a foot to cause the unjacking movement to be begun and particularly to cause the heel band to be opened and thereafter in the same movement of the operator's foot the new treadle can be engaged and depressed for unlocking the hand wheel, thus freeing the shoe carried on the jack post from clamping engagement with the back of the heel band. The arrangement is such that either treadle can be used independently or they may be used successively in the manner above described. There is also provided auxiliary means for freeing the hand wheel lock. This includes a finger piece arranged adjacent to the hand wheel in position to be engaged by the same hand of the operator that is employed for turning the wheel. This friction locking device is superior to the pawl and ratchet heretofore employed in that it holds the wheel exactly where it is moved and not only are there no ratchet teeth to be stripped or worn in use but the wheel which has to be often gripped and turned by the operator has no rough faces to injure the hands of the workman. The arrangement for automatically unlocking the hand wheel as an incident to the unjacking movements saves an independent operation and increases the capacity of the machine.

The machine as heretofore equipped has been provided with a foot treadle and a rod extending to the heel post by means of which the post and the last carried thereon could be lifted against the heel wipers after the latter had worked the upper over upon the heel seat. The purpose of this lifting movement was to compress the upper material against the bottom of the last for smoothing and compacting the heel seat of the lasted shoe. This lifting mechanism is fully explained in prior United States Letters Patent No. 521,954. In accordance with a feature of this invention provision is made for locking the lifting device in its raised position so that the shoe may be rigidly held up while the securing tacks are being driven into the heel seat without requiring that the operator shall retain his foot on the treadle for this purpose. The lifting treadle is provided with a ratchet face adapted to be engaged by a pawl carried on a rockshaft mounted in the frame of the machine and provided with an outstanding arm conveniently accessible to the foot of the operator whereby he may disengage the pawl at his pleasure. The rockshaft also has another arm depending in the path of a stud carried by the treadle which is instrumental in effecting the unjacking operation, before mentioned. This arrangement is such that the third arm of the rockshaft will be turned for lifting the locking pawl as an incident of the unjacking operation and will not require any special attention from the operator. This feature of the invention has the advantage that the lifting device is automatically locked and automatically unlocked so that no time or attention from the operator is required for obtaining the desired result of holding the shoe rigidly during the tack inserting operation.

A further feature of this invention consists in novel means for holding the wiper plates upon the wiper carriers. An object of this construction is to provide means which will rigidly hold the plates and carriers together and yet permit the plates to be quickly removed from the carriers and replaced by others without the use of tools when it becomes necessary to change the plates for a different style of last. With this object in view the plates, which are formed to fit under an overhanging ledge of the carriers, are provided with a bolt hole in alinement with a hole in the carrier and this hole is countersunk on the lower side of the plate and is connected to the edge of the plate by a slot which will permit the plate to be withdrawn edgewise from the carrier and bolt whenever the head of the bolt is moved downwardly below its countersunk seat. The clamping bolt is provided on its upper end with an eccentric having a finger piece by which it can be easily turned and between the finger piece and the wiper carrier is arranged a spring to be compressed when the eccentric is turned for drawing the head of the bolt into its seat and which spring takes up any lost motion and serves to hold the head firm in its seat at all times. Another characteristic of the illustrated machine is found in the provision of an intermediate plate adjustably connecting the toe lasting carriage with the support upon which the carriage is moved for positioning the lasting devices to operate on shoes of different lengths. This machine is designed, by the use of the adjustments provided, to operate upon all the several groups of sizes of shoes, as men's, women's and children's shoes. In order to avoid the use of a long adjusting screw which would be required to adjust from the largest man's size to the small child's size the intermediate plate is arranged for adjustment by the screw and the lasting carriage is mounted on the plate so that it can be shifted to and locked in different positions on that plate according to the large or small group of shoes to be worked upon.

A further feature of this invention consists in novel means for effecting adjustment, either primarily or supplementally, for the swing or the crookedness of the last. In my prior Patent No. 1,018,477 explanation is made of the fact that adjustment for crookedness of lasts can advantageously be made about a center located at the intersection of the median line of the forepart of the last with the median line of the heel part of the last. In addition to this adjustment there is sometimes need for adjustment, particularly of the toe lasting mechanism, for the swing, or outward curvature on the outer side of the forepart of a last in excess of that on the inner side of the last. In accordance with this feature I have combined with the usual means for adjusting an end lasting mechanism lengthwise of the shoe and the means shown in my prior Patent No. 1,018,477 for adjusting it about a center located substantially under the toe of the shoe, a means for effecting a right line transverse adjustment. By these provisions an end lasting mechanism, including lasting devices and their actuating mechanism, can be shifted laterally to bring the center of the lasting devices opposite the middle of the toe, then shifted angularly to bring them into position to face squarely toward the shoe and to advance in the median line of that end of the shoe, and finally be set up longitudinally to operative relation to the shoe. Accurate positioning by means of these three adjustments can be made although it is not contemplated that right line adjustment will be employed except for an auxiliary arrangement when the provision described in my prior Patent No. 1,018,477 for adjustment about a center located at the intersection of the median lines of the last is available.

The features of this invention above mentioned and others, including certain combinations of parts and more important details of construction, will appear in connection with the following description of the machine and will then be pointed out in the claims at the end of the description.

Figure 2:
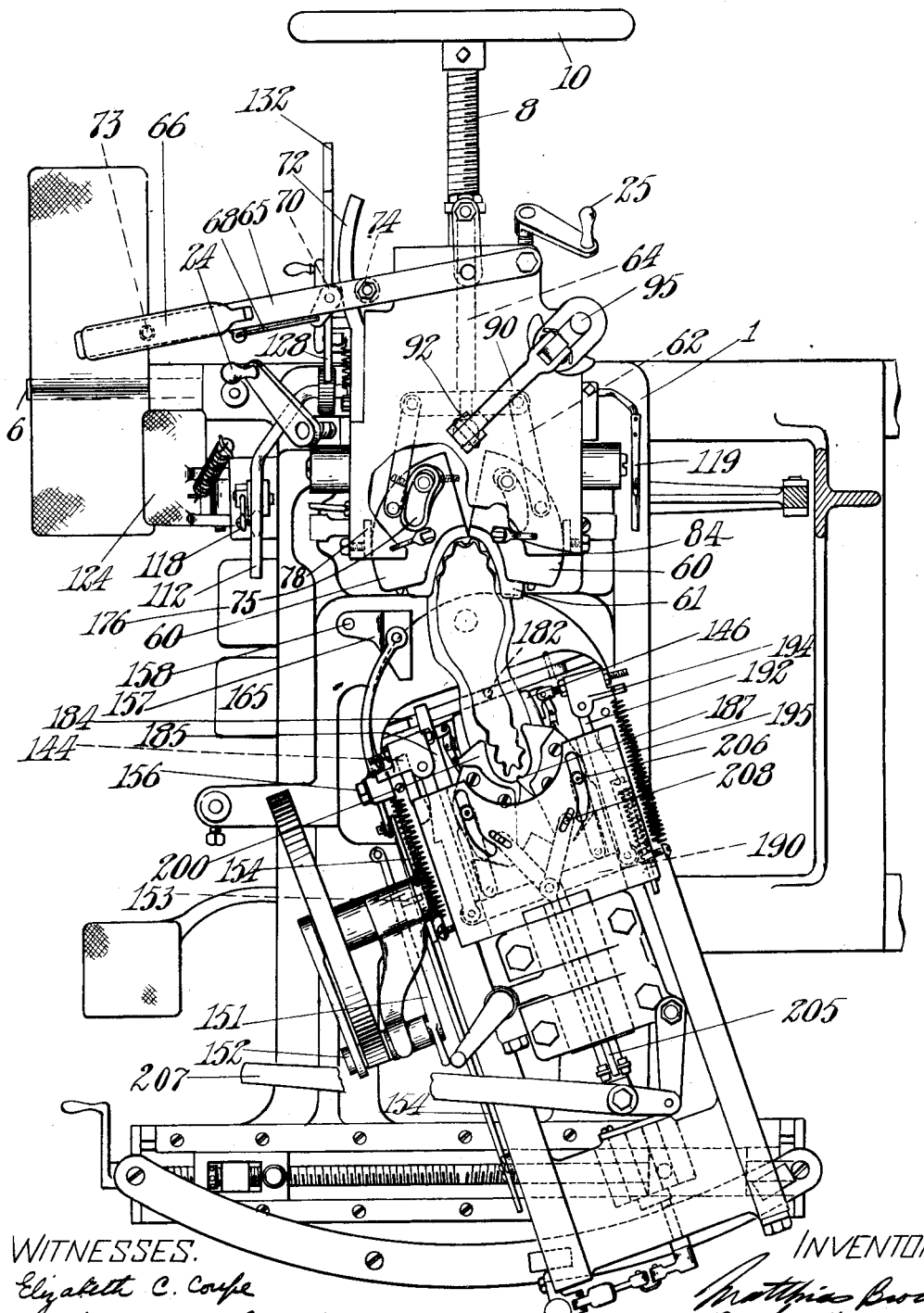
Figure 5:
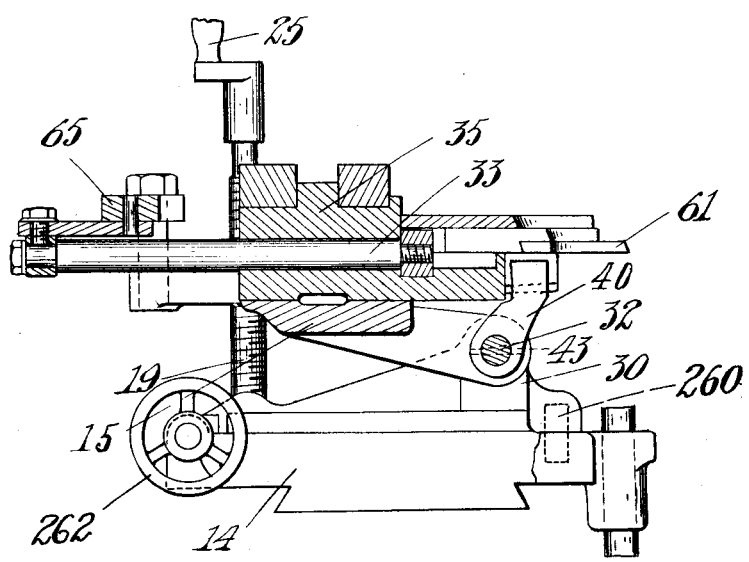
Figure 6:
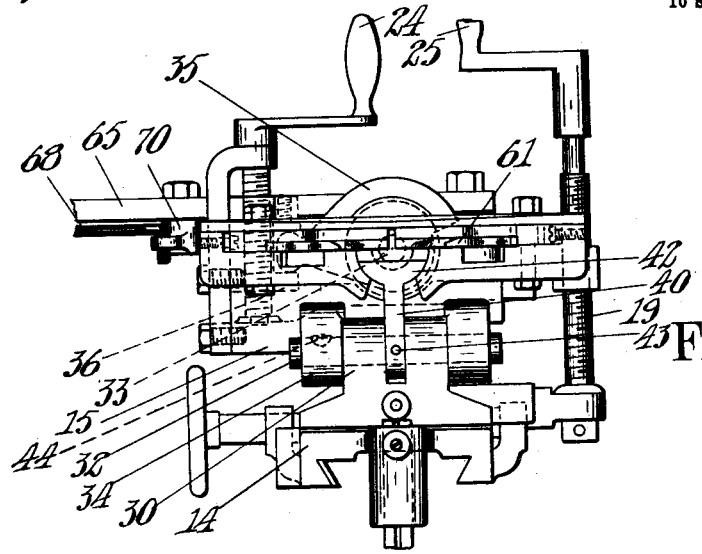
Figure 7:
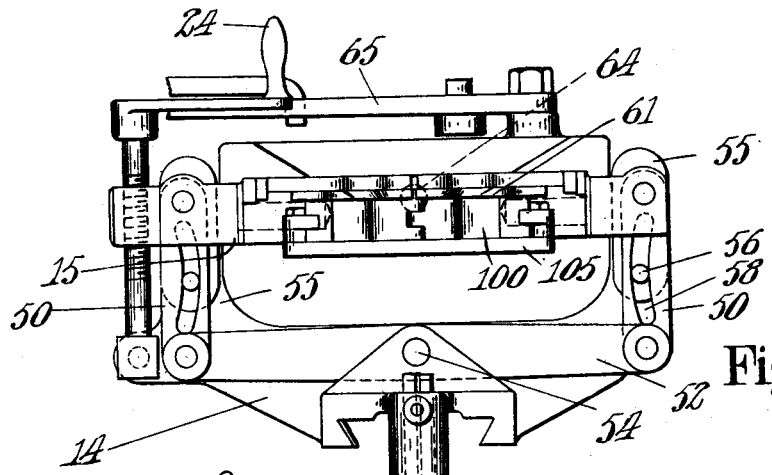
Figure 8:
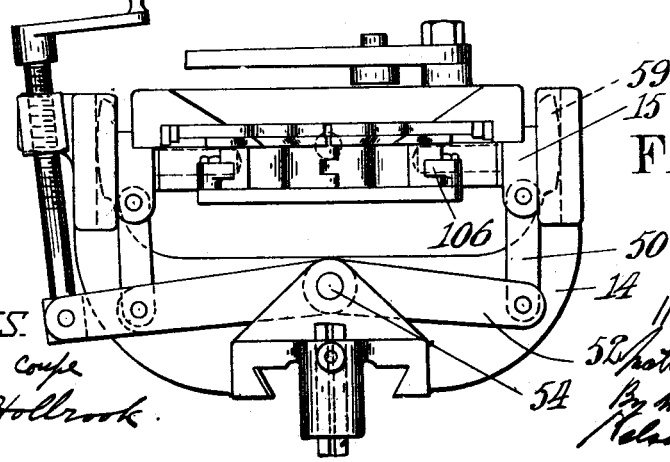
Figure 9:
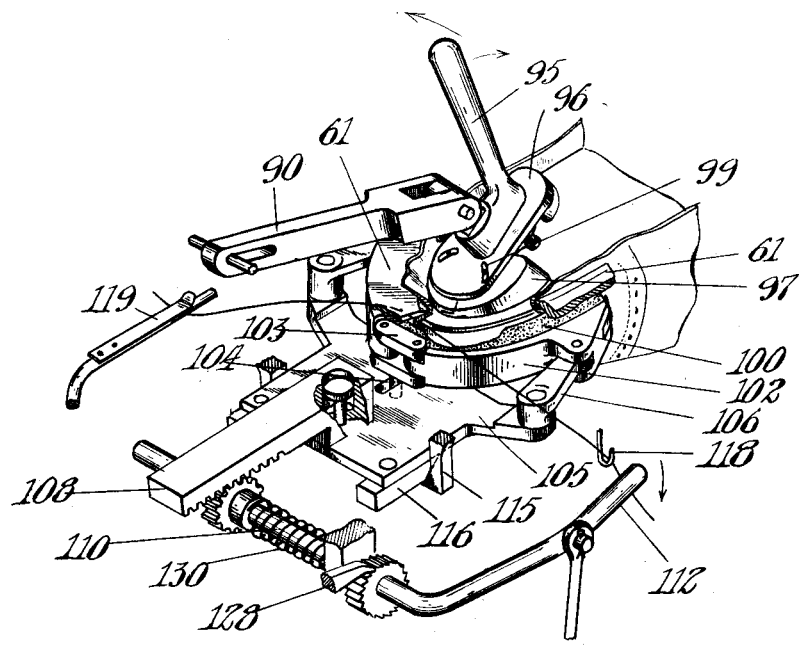
Figures 10, 11:
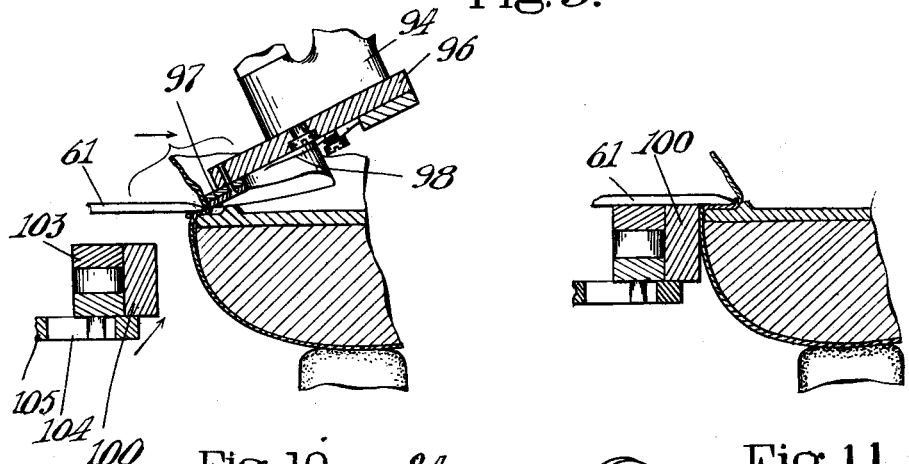
Figure 12:
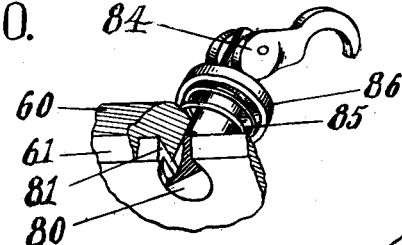
Figure 13:
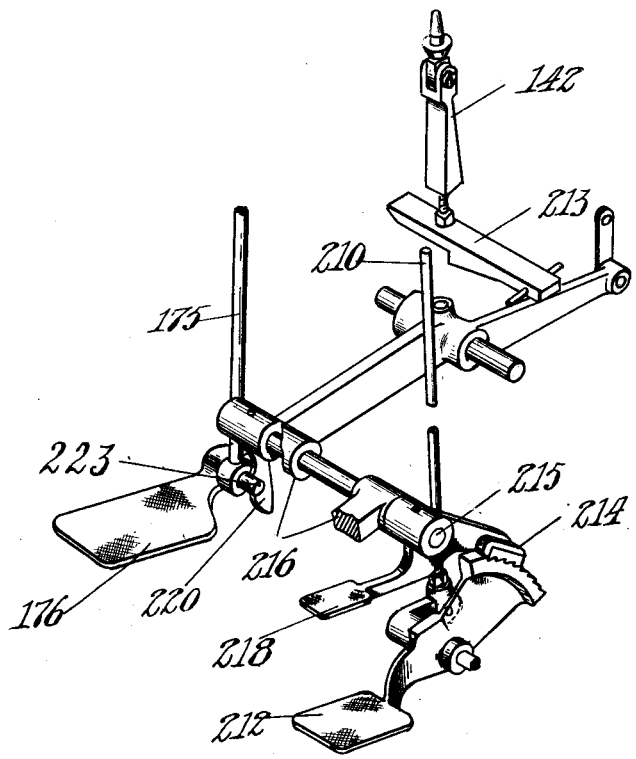
Figure 14:
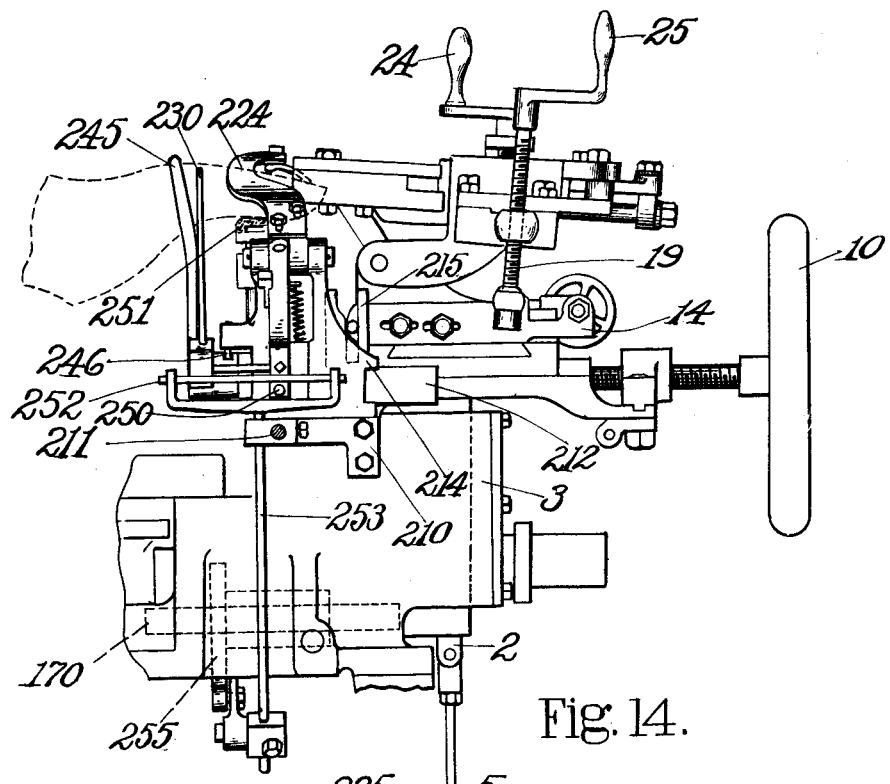
Figure 15:
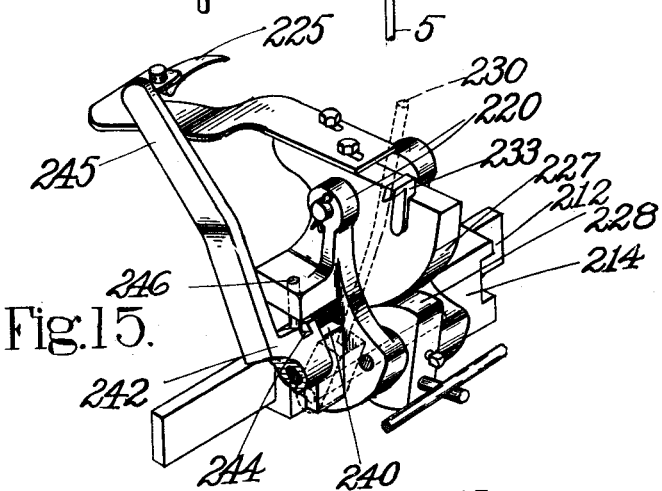
Figure 16:
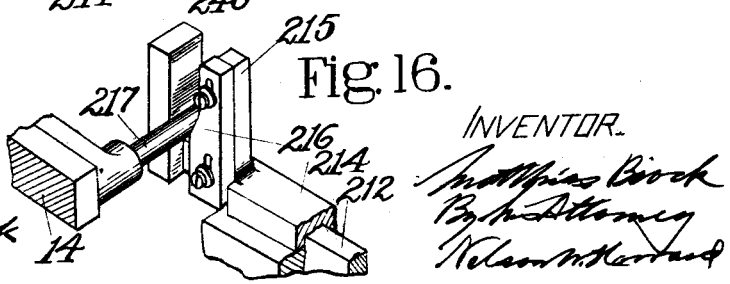
Figure 19:
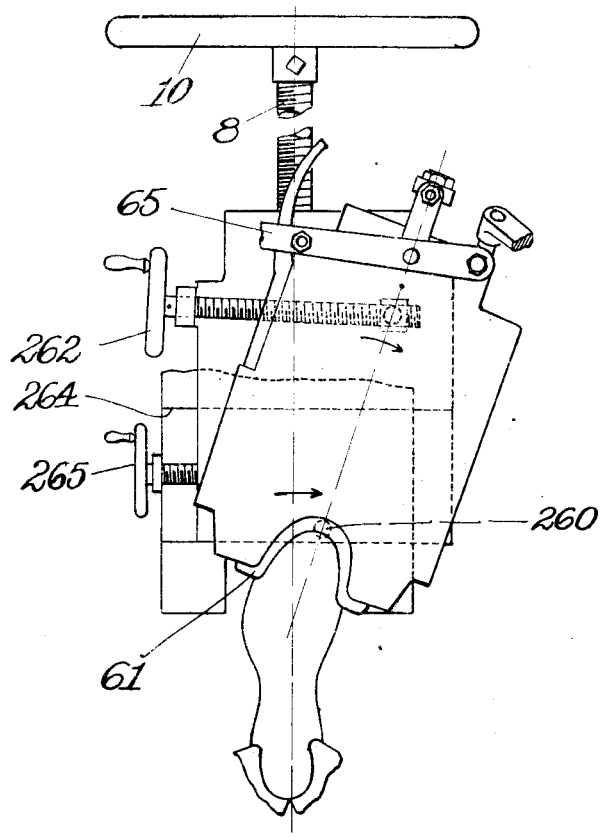

Figure 1 is a side elevation of the machine; Fig. 2 is a plan of the machine; Fig. 3 is a transverse vertical section through the frame on which the heel carriage slides, the heel carriage being understood to have been retracted back of the section planed; Fig. 4 is a detail which will be referred to in the description; Fig. 5 is a sectional view of a modification of the toe lasting mechanism and the supporting means for the toe lasting mechanism; Fig. 6 is an end elevation of the mechanism shown in Fig. 5; Figs. 7 and 8 show further modifications; Fig. 9 is a perspective view showing the toe band and its supporting and actuating mechanism; Figs. 10 and 11 are sectional views showing different stages in the toe lasting operation; Fig. 12 is a perspective view of the clamping device used for holding the wipers upon the wiper carriers; Fig. 13 is a perspective view of the heel post raising and locking means. Fig. 14 is an elevation of the toe end of the machine showing the modification illustrated in Figs. 5 and 6, the tacker being omitted. Fig. 15 is a perspective view of the hold down mechanism; Fig. 16 is a detail showing the adjusting connection between the holddowns and the toe lasting head; Fig. 17 is a perspective view from a different angle and shows the relation of the holddown to the cam shaft, to the toe lasting head and the toe wipers and an operative relation to the shoe; Fig. 18 is a plan view of the toe lasting head with the holddown in use; Fig. 19 is a diagrammatic view showing the toe lasting mechanism adjusted for a crooked last by means which will be described.

The machine comprises in addition to the shoe supporting means and its associated parts for effecting the jacking of the shoe, end lasting mechanisms for the toe and heel. The toe lasting mechanism, shown at the left in Fig. 1, is mounted on a plunger 2 guided in an extension 3 of the frame 1 and yieldingly upheld in a normal position by springs 4. A rod 5 has connection with an arm on a rock shaft 6 that has a foot plate extending on either side of the shaft so that by depressing one end or the other of the foot plate the toe lasting mechanism may be actuated either upwardly or downwardly by the operator. The upper face of the plunger has a dovetailed rib to guide the lasting mechanism in longitudinal adjustment which is effected by a screw 8 which is held against lengthwise movement in the plunger and has a hand wheel 10 by which it is turned, all as usual in machines of this class, to position the toe lasting mechanism with relation to the heel lasting mechanism which occupies a substantially constant position lengthwise of the machine for shoes of all sizes. The screw, in accordance with this invention, engages a plate 12 that is intermediate the plunger and the base 14 of the lasting mechanism and has a sliding longitudinal dovetail engagement with each of these parts. The plate has a plurality of recesses 13 in its side edges that are adapted to receive one or more latches 16 pivoted to the base. This provision of the adjustable intermediate plate upon which base 14 can be set forward or backward allows for additional adjustment of the toe lasting mechanism lengthwise in certain definite long steps suitable for different groups of sizes of shoes like men's, women's, and children's, and permits of the use of a comparatively short screw 8 instead of one which would be long enough to provide the entire adjustment.

The base 14 and the carriage 15 which more directly supports the toe lasting devices are connected by means that permits a lateral tipping or angular adjustment of the toe lasting devices about an axis that extends centrally lengthwise of the shoe and is preferably located substantially in the plane of action of the wipers which are to be described. This permits tilting of the lasting devices, for example the wiper plates and toe band if one is used, transversely for positioning them parallel with last bottoms which are transversely inclined. This connection may be formed in any suitable way. In Figs. 1 and 3 the base is provided with a guideway shown in dotted lines in Fig. 3 as curved about an axis extending and located as above explained. The carriage has a depending yoke 17 provided with a curved rib 18 on its front face which is received in said guideway and overlapped by a lip thereof as may be seen in Fig. 1. This connection has the advantage over prior constructions such for example as that shown in my prior Patent No. 1,018,477 and formerly used in this machine that the yoke provides a guideway or open space lengthwise of the machine through which the toe band actuating devices hereinafter described can conveniently be operated. The base has a lateral arm 20 from which rises a screw 22 working in a swivel nut in the carriage and operated by a hand crank 24 to effect lateral tipping or angular adjustment of the carriage for last bottoms which are transversely inclined. The outer or left hand end of the carriage 15, see Fig. 1, is supported by a single rod 19 which has a universal swiveling connection at 21 with the carriage to permit the transverse tipping adjustment effected by the screw 22. The front end of the carriage is connected with the yoke 17 by trunnions 23 and the rod 19 is screw threaded where it passes through the connection 21 and has a hand crank 25 by which the carriage can be tipped about a transverse axis in the trunnions 23 for positioning the lasting devices for the longitudinal inclination of a last bottom. In the illustrated construction the transverse axis of this latter movement is located in the same horizontal plane as the longitudinal axis about which tipping is effected by screw 22.

In the construction illustrated in Figs. 5 and 6 the base 14 has rising from its inner end, corresponding to the right hand end in Fig. 1, bearings 30 for a transverse axle 32 which corresponds in function to the trunnions 23 and on this axle are supported the bearings 34 of the carriage 15 that carries the wiper plates. The screw 19 for effecting adjustment about this transverse axis is in this instance located at the rear side of the machine. The lasting devices are in this construction laterally adjusted angularly about an axis in the rod 33 as in the United States Letters Patent to Grandy 552,834, by means of a sleeve 35 having a lateral lug embraced by a forked block 36 that is moved up and down by a screw corresponding to the screw 22 and having the same hand crank 24. One of the forks of the block 36 is adjustable to take up wear so that there may be no loose angular movement of lasting devices such as is liable to occur where screw threaded constructions are employed. The front end of the sleeve 35 is connected to the base through the axle 32 and a tie rod 40 to prevent the sleeve and the wipers carried by it from springing or yielding upwardly when the wipers are required to exert heavy downward pressure in shaping the upper materials over the toe end of a last. This tie rod has a sector shaped head 42 which rests in the front end of the sleeve. The sleeve is cut away to permit turning relatively to the sleeve of the tie rod and the latter has at its lower end an eye to receive the axle 32. The tie rod is pinned to the axle at 43 and the axle which has a turning fit in the bearings 30 is keyed to the bearings 34 as at 44 whereby the tie rod is tipped with the carriage 15 and the sleeve when the hand crank 25 is turned. This is to prevent either binding or loose movement of the tie rod head in the sleeve. In Figs. 7 and 8 a modified construction is shown in which, as in Figs. 1 and 3, the carriage tips laterally about an imaginary axis instead of a pivot like the rod 33 in Figs. 5 and 6. In Fig. 7 the carriage 15 is vertically supported by links 50 rising from a lever 52 pivoted to the base at 54. A screw rod the equivalent of screw 22 and having the same hand crank 24 connects the base with the carriage.

Uprights 55 rising from the base have studs 56 that extend into curved guiding slots 58 in the links 50 and determine the lateral position of the carriage, resisting any sidewise strains which may be transmitted through the wipers.

In Fig. 8 the upright arms 55 and the carriage have mutually engaging, lateral, bearing faces serving the purpose of the studs 56 and slots 58 of Fig. 7. The bearing faces 59 on the carriage are curved in an arc about the axis as to which the carriage turns or tips. The adjusting screw in this instance may connect the lever 52 with a boss on the upright arm that extends from the base so that the adjusting movement is effected through the lever and links in this construction whereas in Fig. 7 the lever and links serve merely as guiding and supporting means and the adjusting movement is transmitted by a direct connection of the screw with a boss on the carriage. The constructions shown in Figs. 7 and 8 give opportunity for the use of a yoke shaped carriage within or through which the toe band operating mechanism can be supported and actuated.

The carriage 15 supports the wiper carriers 60, 60, for the wiper plates 61 which may be of usual formation to present a continuous wiping edge for embracing the toe end of the shoe and wiping the upper over the shoe edge simultaneously at the sides and end of the toe. The plates are connected by links 62 see Fig. 2, to a cross head of an endwise movable rod 64 guided in the carriage 17 and connected by a link to a lever 65. The lever is fulcrumed at the rear side of the machine and, projecting across to the front, has a cover plate 66 fulcrumed in a slot in the lever and connected by link 68 with an arm of a block 70 pivoted on the lever and having an eccentric face to engage the outer side of a locking bar 72. This bar is curved in an arc about the fulcrum point of the wiper operating lever 65 which is shown as having a depending roll 74 to engage the rear side of the bar 72 so that the bar can be gripped more securely between the eccentric friction block and the roll to hold the lever in the position to which it may be moved. A spring 73 between the handle and the cover plate 66 actuates the latter and the eccentric in the direction to cause the eccentric to grip the locking bar. Downward pressure on the cover plate when the handle is gripped reversely turns the eccentric to release its grip and permit free movement of the wiper operating lever.

The wiper carriers 60 each have a cam slot formed in an adjustable plate 75 held in position by opposed screws as shown in Fig. 2 and by which the direction of movement of the wipers is controlled and may be adjusted in an obvious manner to avoid need for changes of wipers to fit shoes of slightly different shapes. The carriage also has adjustable hardened contact plates 78 for engaging the outer edges of the plates 60 which are curved concentrically with relation to their adjacent edge ends about which they turn in closing. These adjustable contact plates provide for taking up wear and for adjusting the wipers transversely of the shoe, both in setting up the machine or applying new wiper carriers which are not made with absolute accuracy, and in adapting the wipers to particular shapes of lasts. The wiper plates are removably held in the carrier by clamps which comprise a head 80 countersunk in a seat in the plate. The seat is connected with the edge of the plate by a slot which permits the plate to be withdrawn from its carrier when the clamp is lowered to a position where its head is below the lower face of the plate. The clamp has a stem extending through the wiper carrier and carries a pivoted eccentric 84 that acts through a cup washer 86 and a spring 85 to draw the head 80 into holding relation in the plate. The spring 85 takes up lost motion and maintains the eccentric in adjusted position.

A retarder to coöperate with the wipers is carried on a swinging arm 90 having a pin and slot connection with a stud 92 swiveled in the cover plate of the toe carriage. This retarder comprises a block 94 with a handle 95 extending obliquely upwardly and backwardly as shown in Fig. 1 to permit downward and forward pressure to be conveniently applied. A plate 96 on the lower face of the block carries two fingers 97 pivoted together and to the plate at their front adjacent ends and held apart by springs 98 as shown in Fig. 3. The fingers have studs that stand in curved guiding slots 99 in the plate to control their movements. These fingers are adapted as shown in Figs. 9 and 10 to engage the upper material against the wipers as the fringe of that material is embraced by the wipers and by such engagement to clamp the upper against the wipers and pull the upper when these parts of the machine with the entire toe head are raised by depressing the front end of the foot plate that is on rock shaft 6. The upper is not necessarily clamped so securely between the wipers and the fingers 97 that it cannot slip at all but the fingers retard the slipping of the stock sufficient to enable a pull to be exerted on the upper to form it about the side faces of the last and over the edge of the shoe bottom. When this retarder is used the upper need not be engaged by the wipers below that portion that will be folded over the edge of the shoe bottom so that in lasting shoes made of some russet or other leathers which would be liable to be discolored by the frictional engagement of the wipers there need be no marks of the wipers left on the portion of the upper that will show in the completed shoe. The operator controls the wipers with one hand and the retarder with the other and raises the whole head with the foot so to determine the force with which the upper is clamped that the stretching of the upper about the toe portion of the last can be effected according to the "feel" of the work or the resistance which is detected to the pressures being applied, and the tension may be varied according to the conditions in each shoe by a skilful laster. One other advantage incident to the use of the retarder as described is that the upper clamped between the wiper and retarder can be pulled up until the wipers are above the level of the feather edge of the innersole and then carried inwardly over the innersole without the danger of lifting and rolling or crowding back the thin feather of the innersole which is liable to occur when the wipers rub the stock upwardly against the side faces of the last. When the wipers are closed to lay the upper inwardly over the margin of the shoe bottom as in Fig. 10 the retarder is permitted to slide heelward by reason of the pin and slot connection with the stud 92 and the fingers 97 close together under the lateral pressure of the closing wipers. This is a great advantage because the retarder can thus be caused to act with the same force throughout the closing movement of the wipers and moreover the retarder is thus capable of adapting itself to shoes of different sizes. The plate 96 is shown as pivoted upon the block 94, against which it is frictionally held against free turning, and is capable of being reversed to present its second end which is smaller and provided with smaller fingers. The same retarder can therefore be used for widely different sizes and shapes of shoes.

The toe band 100 is made of leather or other suitable flexible material secured to a flexible carrier comprising two arms 102 centrally connected by links 103 from the lower one of which depends a stud into a guiding groove 104 in the supporting plate 105 upon which the central portion of the arms 102 rest. The outer ends of these arms are connected by links 106 to the plate so that as the band is advanced and its central portion contacts with the end of the shoe that portion of the band will yield backwardly along the guide slot 104 while the arms 102 and links 106 swing inwardly until the band conforms substantially to the shape of the last as it reaches clamping relation to it. The supporting plate 105 is connected by a rack bar 108 with a pinion on a shaft 110 having a crank 112 by which the band may be advanced into position to embrace and clamp the upper about the toe portion of the last. The supporting plate is held up by a bar 115 and the plate has wedges or inclines 116 to engage the bar and raise the plate as the band is advanced toward closing position and permit the band to fall away from the plane of the wipers when it is retracted, see Figs. 11 and 10. This arrangement permits the wire or other binder w which is used for securing the upper in lasted position about the toe of the shoe to be extended across the machine below the wipers as from the hook 118 to the clasp 119 in Fig. 2 and between the plane of the wipers and the band as appears in Fig. 10. The wire is then in readiness to be drawn under the wipers (dotted lines in Fig. 10) toward holding position after the wipers are raised enough to let the wire under them. Before this has been done however, or after if desired, the band is advanced and is raised as it goes forward into clamping position. The band thus can hold the upper while the wipers are raised and readvanced to assist in seating the wire. Preferably the wedges 116 are so arranged that the band is fully raised before it reaches engagement with the shoe. This prevents liability of injuring the upper by the friction of the leather or other band-material against the upper, as might occur in making colored shoes, and it makes possible to preserve the shape of the upper edge of the acting face of the band which would become distorted if the band were caused to wipe upwardly along the shoe. This upper edge of the band is preferably formed square as shown in Figs. 10 and 11 to coöperate with the wipers in forming a square or angular edge at the juncture of the side and bottom faces of the shoe. Such an edge is preferred in fine shoes in place of the rounded edge which tends to form when the upper is wiped over the edge of the shoe bottom. With the illustrated arrangement the edge can be molded by forcibly depressing the toe lasting mechanism by the treadle on rock shaft 6 while the shoe is independently upheld by the toe rest.

The crank 112 is connected by a rod 120 with a bar 122 having a ratchet face on the lower portion as shown in Fig. 4 which is adapted to be engaged by foot pawl 124 pivoted to a slide 125 that is held up by a spring 126, see also Fig. 1. This arrangement permits the operator, if his hands are occupied, to use his foot for actuating the toe band. Pressure on the pawl first turns it to the ratchet bar and then depresses the pawl and bar together to advance the band. The band is locked by a ratchet disk and pawl 128 see Fig. 9 and when pressure is removed from the foot plate 124 the spring 126 swings the plate away from the ratchet bar leaving the latter free so that when the pawl 128 is raised the toe band can be retracted by a torsion spring 130 that encircles the shaft 110 Fig. 9. The pawl 128 is extended to the left from its pivot in Fig. 1 and has a projection at 132 to be engaged by the wiper operating lever 65 whereby when the wipers have been retracted the pawl will be tripped to permit the band to be retracted by spring 130. The pawl can of course be tripped at any time by direct pressure upon said extension.

The heel post 142 is so supported that in addition to the rising movement that is given it during its retraction by the hand wheel 148 in jacking the shoe it can be further pressed upwardly to raise the shoe for compressing the upper between the wipers and the heel seat of the last. This is done by a rod 210, see Figs. 1 and 13, which is connected to a treadle 212 and abuts upwardly against the pivoted wedge plate 213, Fig. 13, which by a connection to the hand wheel is instrumental in initially raising the post. These parts are all as in the prior machines but in the present machine mechanism is added to lock the treadle 212 with the post raised so that the operator is not required to maintain his foot on the treadle. To this end a pawl 214 is attached to an arm of a rock shaft 215 supported from the frame in a bracket 216 and this pawl overlies a ratchet face formed on an extension of the treadle. A second arm of the rock shaft has a foot piece 218 by which the pawl can be lifted by a special movement of the operator's foot. To avoid the need for this special movement of the operator's foot in the ordinary use of the machine the rock shaft has a third arm 220 with a cam face depending in the path of a stud 223 on the cam shaft operating or starting treadle 176 so that when treadle 176 is depressed to produce the movements of the cam shaft for unjacking the shoe the pawl 214 will be raised automatically or as an incident to the unjacking operation and the heel post will be released in time relation with the other unjacking movements.

The heel carriage, which as a whole is indicated at 140, is movable lengthwise of the machine from and toward its operative position shown in Fig. 1, being moved backwardly to permit the application of the shoe to the heel post 142, and is locked in its operative position by the engagement of a latch 144 with a shoulder on the frame. This operative position of the heel lasting mechanism is, therefore, always the same. After the carriage has been locked as described, the shoe is drawn backwardly into the heel band 146 and yieldingly raised by connections to a hand wheel 148 (see Fig. 1). These parts are or may be all as in prior constructions of this machine. It is necessary to lock the hand wheel 148 in order to hold the parts in adjusted position during the lasting operation and to this end a friction block 150 is mounted on a swinging arm 151 pivoted at 152 to hangers from the hand wheel shaft or its bearings and supporting the block 150 in position to engage the periphery of the hand wheel. The arm 151 has on its rear side a stud 153 that overlies a bar 154 suspended by parallel links 155. The left hand link is extended above its pivot and connected by a link to one arm of a rock shaft 156, the other arm of which rests upon the head 157 of a rod 158 (see also Figs. 2 and 3). The lower end of this rod rests upon a rocker 160 having a roll arranged to be engaged by the inclined face of a slide 162 which is connected by a rod 164 to a treadle 165 upheld by a spring 166.

The friction block 150 and its associated parts are so arranged that the block is held by gravity in frictional engagement with the hand wheel, although a spring may of course be added if that is found desirable. By depressing the treadle 165 and turning the rocker 160 the rock shaft 156 is turned in the direction to move the friction block away from the hand wheel when it is desired to release the shoe, as, for example, after the lasting operation has been completed. The locking device 150 is also mounted for movement independently of the described mechanism by an upright bar 168 (see Fig. 1) which stands in position to be conveniently engaged by the operator.

After the shoe has been pulled backwardly into the heel band and raised to its proper level the heel band is closed, and incidentally it may be remarked that the toe rest is simultaneously lifted to its proper level by movement communicated from the cam shaft 170 (see Fig. 3). This cam shaft is turned through a ratchet shown as having three teeth 172 engaged by a pawl 174 on a circularly movable pawl carrier which may be actuated either by power or by a connection through rod 175 to a foot treadle 176. Both of these arrangements are in common use on commercial machines of this type and no detailed description is necessary, although it may be remarked that a treadle or an equivalent device corresponding to the treadle 176 is employed for starting the power driven mechanism when that mechanism is employed. There is also as in such prior machines a connection from the cam shaft for lifting the latch 144 to let the heel carriage move backwardly away from the shoe. This connection includes a cam finger 178 (see Fig. 3) which engages a slide 180 to lift the pin 182 and a swinging transverse bar 184 (see also Fig. 2) which underlies an arm 185 of the latch carrying rock shaft 145.

When the lasting of the shoe has been completed and the shoe is to be taken from the machine the heel band should be first opened and the toe rest lowered to free the shoe from these parts and the latch 144 must be lifted to permit the carriage to move away from the shoe. Then the heel post should be lowered to free the shoe from contact with the heel band and the heel lasting wipers or with the overhanging projection 187 of the wipers against which the shoe was raised when the heel post was lifted. The treadle 176, controlling the cam shaft, and the treadle 165 for unlocking the hand wheel controlling the heel post are shown as arranged side by side with the treadle 176 at the higher level so that it may be depressed for opening the heel band and unlatching the heel carriage, and then in the further movement of the same foot the treadle 165 may be depressed for lowering the heel post.

The closing of the heel band 146 is effected through connections from the cam shaft. These connections extend to the transverse bar 190, shown in Fig. 2, and from thence through endwise movable slides 192 to levers 194 connected by springs 195 to a fixed portion of the heel lasting carriage. To the inner ends of these levers are attached the end portions of a heel band. In accordance with this invention the levers 194 are made in two parts which are relatively adjustable and held by nuts 198, as shown in Fig. 2, to adapt the heel band for operating upon shoes of widely different sizes.

The heel lasting wiper plates 200 are mounted on wiper carriers similar to those which support the toe lasting plates 61 and these carriers are advanced by connections through diverging links and a longitudinally movable rod 205 with a lever 207. Each of the wiper carriers has projecting upwardly therefrom two studs 206, and 208, which are movable in grooves or slots in the cover plate. These grooves or slots guide the wipers and determine the proportion of the closing to the advancing movement. By providing two guiding studs for each wiper the path of the wiper is at all times controlled and there is no opportunity for loose pivotal movement. This arrangement is of particular value in preventing the wipers when fully closed over a small shoe from slipping past one another at their points of contact and interlocking or binding upon one another so as to make their return movement difficult and cause wear at the adjacent faces of the wipers.

The machine, in accordance with a further feature of this invention is equipped, when it is to be used under certain conditions, with a holddown which is shown best in Figs. 14 to 18. The holddown is supported by the vertically stationary frame of the machine which has a bracket 210 for this purpose, located as appears in Figs. 3 and 14, and secured by usual bolts and by the tie rod 211 that extends from the frame to the tacking mechanism of my prior patent. This bracket has a longitudinally extended guide bar 212 upon which slides a carriage 214 having an upright, vertically grooved arm 215. One side of this groove is formed by an adjustable cam plate 216 by reason of which the groove presents a narrow portion at its bottom and a wider portion at its top. This groove receives a laterally projecting stud 217 from the toe lasting base 14 so that the holddown carriage 214 partakes of the adjustments of the toe lasting mechanism for different lengths of shoes and is therefore always positioned uniformly with relation to the toe lasting devices without attention from the operator. The stud and groove connection permits the characteristic vertical movement of the toe lasting mechanism for rubbing the upper upwardly along the side faces of the last by the wipers while the holddown maintains the last against displacement by such movement. The wide portion of the groove gives opportunity for the toe lasting mechanism to be set up a little, as is sometimes desirable after it has been raised and the wipers advanced, without disturbing the holddown which is maintaining the shoe immovable at such a time.

The holddown carriage 214 carries vertical arms 220 between which is pivotally mounted the holddown, or the base 222 thereof, upon which is adjustably fixed the horizontally bent or goose neck plate 224 carrying the slender, tapering holddown finger or contact member 225 the lower face of which is raised to form a contact surface for engaging the toe portion of the inner sole at the channel lip and a rear contact surface permanently separated from the first-mentioned surface and located relatively thereto to engage the innersole over the ball of the last or substantially opposite the portion of the shoe acted upon by the rear ends of the toe wipers, said member 225 being secured to the plate frictionally by a bolt 226 which permits the contact member to be turned to the right and left for right and left shoes. The base 222 has a weighted rear arm with the locking surface 227 which coöperates with the locking block 228. The pivots of the holddown and the locking block are so arranged, eccentrically with relation to the engaging surfaces of said parts, that the holddown will be locked against rising from any position to which it is turned down. A spring 229 effects the locking automatically and a lever 230 rising from the holddown provides convenient means to effect unlocking while the distribution of weight and a spring 232 raise the holddown as soon as it is released. A limiting stop 233 arrests the rising of the holddown in about a vertical position.

As herein shown, the arms 220 for the holddown are not rigidly attached to the carriage 214 but are formed, as appears in Fig. 17, to slide longitudinally of the machine upon a rib 240 of the carriage 214. On the front of this rib 240, see Fig. 15, there is pivoted a block 242 having an oblique or spiral groove and a handle 245. A stud 246 depends from one arm 220 into this oblique groove so that when the hand lever 245 is turned the arms 220 with the holddown and its locking devices are forced longitudinally of the machine. By this arrangement the holddown can be adjusted forwardly or backwardly to cause it to overlie the lip of a welt innersole and bear upon the feather as closely as desired to the edge, or the holddown may be positioned to abut against the rear or inner face of the lip and can be caused to exert forward pressure to crowd the innersole forwardly upon the last. It may also be backed away from the edge of the innersole to draw rearwardly an innersole that projects too far forwardly with relation to the toe end of the last or it may be moved backwardly to give place to the wipers after having held the edge of the innersole from displacement by the rising of the wipers to rub the upper upwardly along the sides of the last.

The locking block 228 has a stud 250 over which extends a bar 252 connected by a rod 253 with a lever 254 having a roll in the path of a cam 255 on the cam shaft 170 of the machine which is operated to effect the jacking and unjacking of the shoe. In the jacking operation the toe rest 251 is raised as usual in this type of machine to tip the last backwardly into the heel band and it is contemplated that the holddown will be turned down upon the shoe bottom and locked before the toe rest is raised so that the shoe is automatically clamped by the rising of the toe rest in the jacking operation. The arm 224 is resilient enough to prevent breakage. When the shoe is unjacked the cam 255 automatically unlocks the holddown and permits its spring 232 to return it to inoperative position to allow the shoe to be removed from the machine.

The toe lasting mechanism, Fig. 19, is mounted on a vertical pivot 260, see also Fig. 5, by which it can be transversely adjusted angularly about a center located substantially under the toe end of the last. This adjustment is effected by a hand wheel and screw 262. This pivot is mounted in a plate which is movable transversely of the machine in a guideway 264 by a screw and hand wheel 265. By this arrangement the toe lasting mechanism can be shifted sidewise until the middle of the wipers are opposite the middle of a toe, then turned to bring the wipers into alinement with the last and then adjusted forwardly by the hand wheel 10 to set the wipers up to the last whatever its length.

Having described my invention, what I claim as new and desire to secure by Letters Patent of the United States is:

1. In a lasting machine having a last post occupying a substantially constant position for shoes of different lengths and a toe lasting mechanism that is movable from and toward the post into position to operate on the shoes, the provision of a screw to effect fine adjustments of said lasting mechanism for shoes of approximately the same size, and additional means for predetermining any one of a plurality of definite positions of adjustment for groups of sizes, substantially as described.

2. A lasting machine having in combination a support, a lasting mechanism, a screw for adjusting the lasting mechanism on the support for shoes of slightly differing lengths, an additional movable connection between the said mechanism and support to permit independent adjustment in the same direction for shoes of different groups of sizes, and means determining the length of the last-mentioned adjustment in certain definite long steps.

3. In a lasting machine having the screw 10 for adjusting the toe lasting mechanism lengthwise of the machine, upon the support 2, and in combination with said parts, the plate 12 upon which the lasting mechanism is adjustable independently of the screw and which has a notched lateral edge, and a pivoted latch 16 carried by the lasting mechanism and fitting in said notches to cause adjusting movements from the screw to be transmitted through said plate to the lasting mechanism.

4. A lasting machine having, in combination, a frame, shoe supporting means including a toe rest and a heel post, a heel lasting mechanism which with the heel post occupies substantially constant operative positions longitudinally of the frame for all sizes of shoes, a toe lasting mechanism having a guiding connection with the toe rest, an intermediate plate arranged between the frame and the base of the toe lasting mechanism and having interlocking connections with the base of the toe lasting mechanism by which said mechanism and the toe rest may be positioned lengthwise of the machine in certain relations to the heel lasting mechanism and the heel post suitable for use on certain groups of sizes of shoes, and a screw and hand wheel connecting the said plate and the frame for making the adjustments of the toe lasting mechanism and toe rest between sizes of the same group.

5. A lasting machine having in combination to lasting mechanism, heel lasting mechanism, actuating mechanisms, and means for adjusting one of said lasting mechanisms and its actuating mechanism by a substantially right line movement transversely of the machine and also means for making lateral adjustment thereof about an axis located substantially under the adjacent end of the last.

6. A lasting machine having in combination toe lasting mechanism, heel lasting mechanism, actuating mechanisms, said machine having provision for adjustment of one of said lasting mechanisms and its actuating mechanisms transversely about a center located at the intersection of the median lines of the forepart and the heel part of the last, and means for also laterally adjusting one of said lasting mechanisms about a center located substantially under the adjacent end of the last and transversely of the mechanism in a right line.

7. A lasting machine having in combination toe lasting mechanism, heel lasting mechanism, actuating mechanisms, said machine having provision for adjustment of one of said lasting mechanisms and its actuating mechanisms transversely about a center located at the intersection of the median lines of the forepart and the heel part of the last, and means for also laterally adjusting one of said lasting mechanisms transversely of the machine in a right line.

8. A machine of the class described having in combination, a base, end lasting mechanism supported thereon at one end by a sliding connection permitting adjustment of the mechanism about an axis extending lengthwise of the machine and supported on the base at the other end by a swivel connection with a rod also arranged to permit such adjustment.

9. In an end lasting mechanism the combination with lasting devices, of a sleeve carrying said devices and adapted for angular movement to adjust said devices and having a lateral arm, a forked block embracing said arm and having provision for adjustment to compensate for wear, and means for actuating said block to turn the sleeve for angularly positioning the lasting devices.

10. A lasting machine having in combination, a base, a carriage, lasting devices on the carriage, a transverse pivot connecting the base and carriage, means in the rear of the pivot for effecting adjustment of the carriage thereon, and a tie bolt connecting the carriage and base in front of the adjusting means to prevent the lasting devices from yielding upwardly and arranged to tip with the carriage.

11. In a lasting machine the combination with the transversely tipping carriage and the base upon which said carriage 50 moves of the tie bolt 40 having a head engaging the carriage and curved about the axis of movement of the carriage, arranged as and for the purpose described.

12. In a lasting machine the combination with the base, of the tipping carriage, the axle connecting the base and carriage, the lasting devices, the sleeve in the carriage arranged to effect lateral angular adjustment of the lasting devices, and the tie bolt 40 having the head fitted into the sleeve and the eye to engage with the axle.

13. In a lasting machine the combination with the base, of the carriage, the axle connecting the base and carriage, the sleeve carrying the lasting devices arranged to turn in the carriage, the tie bolt connected with the sleeve to hold it down but permit it to turn relatively thereto, a non-turning connection between the bolt and the axle, a similar connection between the axle and the carriage, and means for effecting adjustment of the carriage and its supporting parts, the axle and the tie bolt relatively to the base for the purpose described.

14. A lasting machine having, in combination, a frame, shoe supporting means including a toe rest and a heel post, a heel lasting mechanism which with the heel post occupies a substantially constant operative position longitudinally of the machine, a toe lasting mechanism which, with the toe rest, is adjustable lengthwise toward and from the heel lasting mechanism and the heel post for shoes of different lengths, means through which such adjustments can be made, a connection between the toe lasting mechanism and said means permitting transverse adjustment of the toe lasting mechanism for shoes of different degrees of crookedness and including the pivot 260 and the screw and hand wheel 262 for determining the direction of and effecting such transverse adjustment of the toe lasting mechanism.

15. In a machine of the class described the combination with wipers, of a lever for actuating the wipers, a rigidly mounted locking bar having opposite parallel faces, a roll on the lever to engage one face of the bar, an eccentric on the lever adapted to engage the opposite face, a spring to turn the eccentric in the direction to grip the bar between itself and the roll, and means arranged to be operated by the hand of the workman grasping the wiper actuating lever to turn the eccentric for releasing the grip on the locking bar.

16. In a machine of the class described the combination with wipers, of a lever for actuating the wipers, a locking bar 72, the eccentric 70 pivoted thereon, the link 68, the cover plate 66 connected to the eccentric by the link, the spring 73 between the plate and lever to actuate the eccentric to grip the locking bar, and the roll 74 to coöperate with the eccentric in effecting gripping of the locking bar.

17. In a lasting machine the combination with a carriage, wiper plates arranged for operative movement in the carriage, of means for advancing the plates, and means for guiding the plates including stud and slot connection between the plates and carriage comprising relatively adjustable elements for changing the paths in which the plates shall be guided.

18. In a lasting machine the combination with a carriage, wiper plates arranged for operative movement in the carriage, of means for advancing the plates, and means for guiding the plates including stud and slot connection between the plates and carriage, said slots being formed in an adjustable member of the carriage to permit the path in which the plates advance to be changed.

19. In a lasting machine the combination with a carriage, wiper plates arranged for operative movement in the carriage, of means for advancing the plates, and means for guiding the plates to advance and turn, including faces formed on the plates concentric with the center of their relative turning movement, and coöperating guide blocks that are adjustable from and toward said center.

20. In a lasting machine the combination with a carriage, wiper plates arranged for operative movement in the carriage, of means for advancing the plates, and means for guiding the plates including a stud on the carriage and a plate adjustably mounted in the wiper plate and having a cam slot for the stud.

21. In a lasting machine the combination with a wiper carrier, of a clamp comprising a stem and a head, and a wiper plate provided with a hole for the stem and a countersink for its head and with a slot to permit the plate to be withdrawn edgewise from the stem when the head of the clamp is depressed below its countersunk seat.

22. In a lasting machine the combination with a wiper carrier, of a clamp comprising a stem and a head, a wiper plate provided with a hole for the stem and a countersink for its head and with a slot to permit the plate to be withdrawn edgewise from the stem, a cap on the stem, an eccentric locking device, and a spring to be compressed by the locking device for the purpose described.

23. In a lasting machine the combination with a wiper carrier, of a clamp comprising the head 80, the wiper plate having a countersink for the head and a slot extending to its edge, the cap 86, the locking device 84 to draw the heel into the countersink, and the spring 85 arranged to be compressed when the work is turned downwardly and to permit the head to be depressed below its seat when the lock is turned upwardly.

24. In a lasting machine the combination with wipers and means to advance and close them over a shoe end, of a retarder comprising two fingers to engage the upper upon the wipers and arranged for closing movement with the wipers and for advance movement freely under control of the operator and independently of the wiper movement.

25. In a lasting machine the combination with wipers and means to advance and close them over a shoe end, of a retarder comprising two fingers to engage the upper upon the wipers and arranged for advance movement and closing movement with the wipers, and a handle by which the pressure of the retarder is controlled during the movement of the wipers.

26. In a lasting machine a retarder comprising a block, fingers pivoted together and to the block at their front ends adjacent to the tip of the toe and diverging from each other toward the sides of the toe, and springs for holding the fingers separated.

27. In a lasting machine a retarder comprising the block 94, the handle 95, the plate 96 pivotally connected to the block and adapted to be turned end for end thereon, and the spring pressed fingers 97 mounted upon opposite ends of the plate as and for the purpose described.

28. A lasting machine having in combination a last support, end wipers, means for actuating the wipers and last relatively to cause the wipers to rub the upper upwardly on the side faces of the last toward the edge thereof, an end embracing band, adapted to occupy a position out of touch with the upper during such rubbing operation, and means for actuating the band into clamping engagement with the shoe after such rubbing operation.

29. A lasting machine having in combination a last support, toe wipers, means for actuating the wipers to rub the upper upwardly on the side faces of the last, a toe band, and means arranged to move the toe band into operative relation to the shoe after the wipers have done their work.

30. A lasting machine having in combination a last support, toe wipers, means for actuating the wipers to rub the upper upwardly on the side faces of the last, a toe band, and separate means for actuating the toe band.

31. A lasting machine having in combination a last support, end wipers, a toe band and separate means for raising the wipers and the toe band relatively to the last on the support.

32. A lasting machine having in combination a last support, a toe band, toe wipers, means to actuate the wipers and last relatively to rub the upper upwardly on the side faces of the last, means for advancing the wipers over the shoe bottom, and additional means for closing the toe band.

33. In a lasting machine the combination with wipers, of a toe band and supporting and actuating mechanism therefor constructed and arranged to raise the band to the level of the wipers during its advance and before it reaches operative relation to the shoe.

34. In a lasting machine the combination with wipers, of a toe band normally located below the wipers, means for actuating the wipers over the shoe, and independent means for raising the band to the wipers and then causing it to clamp the upper about the shoe.

35. In a lasting machine the combination with means for supporting a shoe, of means to clamp the upper against the side of the shoe, means adapted to engage the shoe bottom, and supporting and operating means for the clamping means arranged to raise the clamp to a position determined by said engaging means and then advance the clamp into operative relation to the shoe.

36. In a lasting machine an end embracing band normally supported below its operative plane and actuating means arranged to raise the band to its operative plane and then to advance the band in that plane to do its work.

37. In a lasting machine an end embracing band normally supported below its operative plane and actuating means arranged to raise the band to its operative plane and then to advance the band in that plane to do its work, and supporting and actuating mechanism therefor including the plate 105, the rest 115, the wedges 116 and the means to advance the plate arranged to operate as substantially described.

38. In a lasting machine an end embracing band normally supported below its operative plane and actuating means arranged to raise the band to its operative plane and then to advance the band in that plane to do its work, and supporting and actuating mechanism therefor comprising the carrying means 102, 103, the plate 105, the pin and slot guiding connection 104, the swinging links 106 and the means for advancing the plate arranged substantially as and for the purpose described.

39. In a lasting machine, a wiper and a toe band arranged to permit an upper binding wire to be introduced between them, means for actuating the wiper to work the upper into position to be secured by the wire, and means for actuating the band to hold the upper while the wiper is raised to permit the wire to be seated in binding relation to the upper.

40. In a lasting machine a lasting device, a hand operated member for actuating said device, a foot operated member and connections therefrom to the device for alternatively effecting the same actuation of the lasting device.

41. In a lasting machine a lasting device and operating mechanism therefor comprising a ratchet faced bar, a swinging foot pawl, a depressible slide carrying the pawl, and means for holding the slide raised and the pawl away from the bar, and independent means for locking the lasting device in the position to which it is actuated.

42. In a lasting machine a lasting device, operating means for advancing said device, a pawl to lock it in advance position, a second device to be actuated, an operating lever connected therewith and an extension on the pawl arranged to be engaged by said lever after it has operated its connected device whereby the lasting device is released in time relation to a movement of said other device.

43. In a lasting machine the toe band, operating means therefor, including a spring to retract the band, the locking pawl 128 and the wipers, the actuating lever 65 therefor arranged to raise said pawl to permit the spring to retract the band when the wipers are retracted.

44. A lasting machine having, in combination, end lasting wipers, a hand lever to actuate the wipers, an end embracing band, a hand-lever to operate the band, and a foot operated member connected to said hand lever and capable of use to actuate the band.

45. A machine of the class described having, in combination, a base provided with uprights, a carriage supporting heel lasting devices and arranged between said uprights and out of contact therewith, a lever pivoted to the base, links connecting the lever to the carriage, and means for controlling the relation of the links to the uprights arranged to resist lateral displacement of the carriage.

46. A machine of the class described having, in combination, a base provided with uprights, a carriage for end lasting devices arranged between said uprights and having bearing surfaces for engaging said uprights to hold the carriage against lateral movement, said bearing surfaces being curved to permit lateral tilting movement of the carriage, a lever pivoted to the base, and links connecting the lever to the carriage for effecting said tilting movement.

47. A machine of the class described having, in combination, a base 14 having the upright arms 55, the carriage 15 arranged between said upright arms and supporting lasting devices, the lever 52, the links 50 for supporting the carriage between said uprights, and pin and slot connections 56, 58 between the upright arms and the links for controlling the lateral position of the carriage.

48. In a lasting machine, the combination with toe lasting mechanism adapted for use upon large and small shoes, of a retarder comprising a carrier, operating means, and a clamping foot shaped at one end for use with one size or shape of shoes and shaped at its opposite end for use with different shoes and adjustable to present either end in position to coöperate with the wipers and for actuation by said operating means.

49. A machine of the class described having, in combination, a heel embracing band, a heel post for supporting the last, means including a hand wheel for actuating the post to draw the last backwardly into the band, and locking means for the hand wheel comprising an eccentric arranged for movement by gravity automatically into locking engagement with the wheel, and means under control of the operator for lifting the eccentric.

50. A machine of the class described having, in combination, a heel embracing band, a heel post for supporting the last, means including a hand wheel for actuating the post to draw the last backwardly into the band, and locking means for the hand wheel comprising an eccentric arranged for movement by gravity automatically into locking engagement with the wheel, a foot treadle having connections to the eccentric for freeing the latter from the hand wheel, a second foot treadle connected with devices for unjacking the shoe and arranged in relation to the first-mentioned treadle to permit the latter to be carried downwardly with the former during the latter portion of a single treadle depressing movement.

51. A machine of the class described having, in combination, a heel embracing band, a heel post to support a last, means including a hand wheel for pulling the post backwardly to force the last into the band, means for locking the hand wheel, a treadle connected therewith, means for unjacking the shoe, a treadle connected with the unjacking means and arranged at a higher level than the first-mentioned treadle and to move with the latter in its final depression whereby the shoe is first unjacked and then the hand wheel released.

52. In a machine of the class described, the combination with the hand wheel 148, and the eccentric friction locking device 150, of the lever 151 supporting the locking device and having the stud 153, the bar 154 suspended by parallel links in position to engage said stud when the bar is raised, and means for actuating the bar, substantially as described.

53. In a machine of the class described, the combination with the hand wheel 148, and its locking device 150, of the bar 154 suspended by parallel links and arranged to lift the locking device, the foot treadle 165 for actuating the bar, and the treadle 176 for unjacking the shoe arranged in position to permit the same foot of the operator to depress it and later to depress the treadle 165.

54. A machine of the class described having, in combination, heel lasting wipers, a jack post, means for raising the jack post to force the last against the wipers, a treadle for actuating said means, means for locking the treadle with the post in its upraised position, and means for automatically unlocking the treadle while the shoe is being unjacked.

55. A machine of the class described having, in combination, the heel post 142, and the treadle 212 for lifting the heel post, the pawl 214 for locking the treadle, the treadle 176 for unjacking the shoe, and the arm 220 connected with the pawl and arranged in position to be actuated for lifting the pawl by the unjacking movement of the treadle.

56. A lasting machine having in combination, a shoe support, a toe lasting mechanism including wipers arranged for movement relatively to the shoe support to cause the upper to be rubbed upwardly along the side faces of the last and then wiped inwardly over the last bottom, and a toe embracing band arranged to occupy a position out of touch with the shoe during said rubbing operation and to be thereafter caused to clamp the upper to the side faces of the last.

57. A lasting machine having in combination with means for supporting a shoe, end lasting mechanism, means for adjusting said mechanism longitudinally of the shoe, means for adjusting said mechanism transversely of the shoe in a substantially right line, and means for adjusting said mechanism transversely of the shoe about a center located substantially under the adjacent end of the last.

58. A lasting machine having in combination, means for supporting a shoe, and end lasting mechanism movable bodily longitudinally of the shoe and transversely of the shoe both in a right line and also about a center located substantially under the adjacent end of the last.

59. A lasting machine having in combination with means for supporting a shoe, end lasting mechanism and means for positioning said mechanism at different points in an arc around a center under the shoe, comprising provisions for movement laterally and longitudinally of the shoe in right lines and angularly about a vertical axis located substantially under the adjacent end of the shoe.

60. A lasting machine having in combination with means for supporting a shoe, end lasting mechanism and provision for relatively adjusting the shoe and said mechanism longitudinally and transversely of the machine in right lines and angularly about a center located substantially under the adjacent end of the shoe.

61. A lasting machine having in combination, a shoe support and an end lasting mechanism comprising lasting devices and actuating mechanism therefor, said support and lasting mechanism being mounted for relative adjustment transversely of the machine in right lines and also angularly about a center located substantially under the adjacent end of the shoe.

62. A lasting machine having in combination, end lasting mechanism, including lasting devices and actuating mechanism therefor, a support on which the lasting mechanism is mounted for movement transversely of the machine about a pivot located substantially under the edge of the lasting devices and means for adjusting the lasting mechanism and the support on which it is pivoted transversely of the machine in a substantially right line.

63. A lasting machine having in combination, toe lasting mechanism adjustable lengthwise of a shoe, a holddown adjustable with the lasting mechanism, and provision for permitting lengthwise actuation of the lasting mechanism without disturbing the holddown.

64. A lasting machine, having, in combination, toe lasting mechanism adjustable lengthwise of a shoe and also vertically movable, a holddown connected to partake of said lengthwise adjustment of the lasting mechanism and to permit independent lengthwise movement of the lasting mechanism when the latter has been raised.

65. A lasting machine, having, in combination, toe lasting mechanism adjustable lengthwise of a shoe and also vertically movable, a holddown connected to partake of said lengthwise adjustment of the lasting mechanism and to permit independent lengthwise movement of the lasting mechanism when the latter has been raised, said machine including means for automatically restoring the holddown and lasting mechanism to initial relation when said mechanism is lowered.

66. A lasting machine, having, in combination, a last support, a holddown mounted on a horizontal axis at the side of the last to turn downwardly upon the last bottom, and means to lock said holddown in its turned down position, and means for actuating the shoe support to lift the shoe against the locked hold-down.

67. A lasting machine, having, in combination, a last support, a holddown mounted on a horizontal axis at the side of the last to turn downwardly upon the last bottom, and automatically operating locking means therefor constructed and arranged to secure the hold-down in different positions of pressure against shoes of varying thickness.

68. A lasting machine, having, in combination, a last support, a holddown mounted on a horizontal axis at the side of the last to turn downwardly upon the last bottom, means to lock said holddown in its turned down position, and means for automatically unlocking the holddown.

69. A lasting machine, having, in combination, a last support, a holddown mounted on a horizontal axis at the side of the last to turn downwardly upon the last bottom, and means for actuating the holddown lengthwise of the shoe in its down turned position.

70. A lasting machine having in combination, a shoe support, toe lasting devices, a holddown, and means for actuating the holddown forwardly in contact with the innersole during the lasting operation.

71. A lasting machine having in combination, a shoe support, toe lasting devices, a holddown, means for actuating the lasting devices backwardly in contact with the upper material on the last bottom and means for actuating the holddown forwardly in contact with the innersole on the shoe bottom.

72. A lasting machine having in combination, a shoe support, lasting devices arranged to rub the upper upwardly along the side faces of the last and to wipe the upper inwardly over the innersole on the last bottom, means for actuating toe lasting devices, a holddown and means for shifting the holddown from a position to hold the feather of the innersole from being lifted by the rubbing action of the lasting devices to a position back of the innersole lip to hold the innersole from being crowded backwardly by the wiping action of the lasting devices.

73. A lasting machine, having, in combination, a last support, wipers, and a holddown comprising a contact member having a recessed lower face forming a contact surface to engage the toe portion of the innersole at the channel lip and a contact surface permanently separated from the first mentioned surface and located relatively thereto to engage the innersole substantially opposite the portion of the shoe acted upon by the rear ends of the machine wipers.

74. A lasting machine, having, in combination, a toe lasting mechanism horizontally adjustable lengthwise of the machine for lasts of different lengths and movable vertically relatively to the last in a direction substantially perpendicular to the last bottom during the lasting operation, and a holddown mounted to partake of said horizontal adjustment and held against said vertical movement.

75. A lasting machine, having, in combination, a toe lasting mechanism horizontally adjustable lengthwise of the machine for lasts of different lengths and movable vertically relatively to the last in a direction substantially perpendicular to the last bottom during the lasting operation, and a holddown mounted on a vertically stationary support and connected with the head for longitudinal adjustment therewith.

76. A lasting machine, having, in combination, a toe lasting mechanism horizontally adjustable lengthwise of the machine for lasts of different lengths and movable vertically relatively to the last, in a direction substantially perpendicular to the last bottom during the lasting operation, and a holddown mounted on a vertically stationary support and connected with the head by means which permits relative longitudinal movement when the head is raised and restores the holddown and head to predetermined relative positions when the head is down.

77. In a lasting machine the combination with end embracing wipers and means to advance and close them over a shoe end; of a retarder comprising a lever fulcrumed in front of the shoe, a block pivoted to the front end of the lever to turn about an axis extending substantially parallel with the plane of the shoe bottom and having a clamping foot extending across the toe end of the shoe and below the pivot and an operating handle above the pivot.

78. In a lasting machine the combination with end embracing wipers and means to advance and close them over a shoe end; of a retarder comprising a lever fulcrumed in front of the shoe, a block pivoted to the front end of the lever to turn about an axis extending transversely of the shoe and substantially parallel with the plane of the shoe bottom and having expansible clamping fingers below the pivot and a handle above the pivot, all constructed and arranged to cause downward pressure on the handle to force the clamping fingers forwardly and downwardly into the toe portion of the upper embraced by the wipers.

79. In a lasting machine the combination with end embracing wipers and means to advance and close them over a shoe end; of a retarder comprising a lever fulcrumed in front of the shoe and having a handle extending rearwardly over the shoe, a clamping foot arranged to be actuated by the handle, and connections permitting relative movement between the foot and the lever fulcrum in a direction lengthwise of the shoe allowing the foot to be pressed forwardly against the inner face of the upper embraced by the wipers and to accompany the wipers in their movement backwardly over the toe of the shoe.

80. In a lasting machine the combination with end embracing wipers and means to advance and close them over a shoe end; of a retarder comprising a bar arranged substantially parallel with the shoe bottom and fulcrumed in front of the shoe and having an operating handle rigidly attached to it and extended rearwardly over the shoe, and a clamping foot arranged to extend across the end of the shoe and located between the pivot and the handle to engage the upper against the wipers.

81. In a lasting machine the combination with end embracing wipers and means to advance and close them over a shoe end; of a retarder comprising a bar arranged substantially parallel with the shoe bottom and pivotally supported in front of the shoe to turn up and down, said bar having a depending foot adapted for clamping engagement with the marginal portion of the upper embraced by the wipers, and a handle extending rigidly from said bar backwardly over the shoe bottom and through which working pressure is applied.

82. In a lasting machine the combination with end embracing wipers and means to advance and close them over a shoe end; of a retarder comprising an arm pivoted to turn down toward the shoe and free while the retarder is performing its retarding function to slide lengthwise of the shoe with the advance of the wipers, upper engaging means to press the upper against the wipers, and a handle connected with said arm and with said engaging means and extending upwardly and backwardly relatively to the shoe to permit downward and forward pressure to be conveniently applied through it and said engaging means against the work.

83. In a lasting machine the combination with end embracing wipers and means to advance and close them over a shoe end; of a retarder comprising members to engage the upper against the wipers and which is arranged for bodily movement forwardly under control of the operator to permit it to accompany the advance movement of the wipers, and a handle by which the pressure of the retarder is effected during the movement of the wipers.

84. In a lasting machine the combination with end embracing wipers and means to advance and close them over a shoe end; of a retarder comprising a carrier pivoted over the wipers to turn toward and from the shoe and to slide with the advance movement of the wipers, members connected with the carrier and arranged to engage the inner side of the upper materials and force it forwardly against the edges of the wipers, and a handle extending over the shoe and by which the forward pressure of the retarder members is effected.

85. In a lasting machine the combination with end embracing wipers and means to advance and close them over a shoe end; of a retarder comprising a member arranged to engage the inner side of the upper materials against the wipers and having its outer face inclined downwardly and forwardly to a thin edge at its lower side.

86. In a lasting machine the combination with end embracing wipers and means to advance and close them over a shoe end; of a retarder comprising a member arranged to engage the inner side of the upper materials against the wipers and having its inner face beveled backwardly and upwardly to adapt it to reach down over the toe end of the last and engage the inner side of the upper materials between the last and the wipers.

87. In a lasting machine the combination with end embracing wipers and means to advance and close them over a shoe end; of a retarder comprising a reversible holder having upper engaging means shaped at one end to adapt the retarder for use with one shape of shoe and shaped at its other end for use, when the holder is reversed, with a materially different shape of shoe, said upper engaging means at the two ends being constructed and arranged to operate similarly upon the different shapes of toes for which they are adapted.

88. In a lasting machine the combination with end embracing wipers, of a hand lever to operate them, a carriage upon which the wipers are mounted, a treadle by which the carriage can be raised; and a manually controlled retarder also mounted upon the carriage and arranged to engage the inner side of the upper that is against the wipers, said retarder having a handle by which the operator can control its action with one hand while with the other hand he operates the wipers and with his foot he raises the carriage to stretch the upper held by the wipers and retarder, substantially as described.

89. In a lasting machine the combination with end embracing wipers, of a hand lever to operate them, a carriage upon which the wipers are mounted, a treadle by which the carriage can be raised; and a manually controlled retarder also mounted pivotally and slidingly upon the carriage shaped and arranged to hold down the feather of the innersole at the toe end and at the same time to form an abutment between which and the toe embracing wipers the upper materials are clamped while the wipers are raised by the treadle to wipe the upper smoothly to a plane above the feather of the innersole, said pivotal and sliding mounting of the retarder permitting it to be withdrawn backwardly and upwardly as the wipers are finally closed to lay the upper over the shoe bottom.

90. In a lasting machine the combination with toe embracing wipers, of means for actuating them to advance and to close over the toe, and a retarder arranged for movement downwardly and outwardly in a direction inclined to the plane of the shoe bottom to spread and clamp the embraced toe portion of the upper upon the wipers, said retarder comprising pivoted fingers and springs arranged to swing the fingers outwardly.

91. In a lasting machine, toe embracing wipers and means for actuating the wipers to lay the marginal portion of an upper over the last, pivoted fingers meeting at their front ends at the tip of the toe to engage the feather of the shoe innersole and hold it down upon the last bottom, and means for moving the fingers into engagement with the feather and for withdrawing the fingers from the path of the wipers.

92. In a lasting machine, toe embracing wipers and means for actuating the wipers to lay the marginal portion of an upper over the last; means having movable curved fingers to engage the shoe innersole along its edge, means for normally holding said fingers in extended position, and means for lowering said fingers to do their work and raising them out of the way of the wipers.

93. In a lasting machine, toe embracing wipers and means for actuating the wipers to lay the marginal portion of an upper over the last; and means comprising curved fingers pivotally mounted and meeting at their front ends at the tip of the toe to act within the toe portion of the upper embraced by the wipers, said mountings for the fingers permitting them to be moved toward each other for entering the toe, and means operating yieldingly to outspread them for laying the upper against the wipers.

94. In a lasting machine the combination with end embracing wipers and means to advance and close them over a shoe end; of a retarder comprising a carrier which can turn downwardly and can slide lengthwise of the shoe and has a handle through which working pressure can be applied by the operator, and two fingers pivoted together at their front ends and to the carrier and normally held yieldingly spread, said mountings permitting the retarder to slide rearwardly as the wipers are advanced and the fingers to close together under the lateral pressure of the closing wipers.

95. In a lasting machine, the combination with means for sustaining a shoe in position to be operated upon and an arm movable over a shoe supported by said means, of a pressing member connected with said arm and provided with two pressing faces one adapted to the contour of the toe portion of one shape of shoe and the other to the differently shaped toe portion of another shoe, said faces being interchangeably operative and formed to operate similarly upon the different shapes of shoes for which they are adapted.

96. In a lasting machine, the combination with means for sustaining a shoe in position to be operated upon and an arm movable over a shoe supported by said means, of a pressing member provided with two pressing faces, one conforming to the toe portion of one shape of shoe and the other to the differently shaped toe portion of another shoe, and connections between said arm and said pressing member whereby said faces may be made interchangeably operative.

97. In a lasting machine, the combination with means for sustaining a shoe in position to be operated upon and an arm movable over a shoe supported by said means, of a pressing member connected with said arm and provided with a pressing face on its lower side, the lower side of said pressing member being recessed and provided with beveled edges to form a depending marginal ridge affording a concentrated bearing of the plate at its edge.

In testimony whereof I have signed my name to this specification in the presence of two subscribing witnesses.

MATTHIAS BROCK.

Witnesses:
EDITH C. HOLBROOK,
ELIZABETH C. COUPE.

Copies of this patent may be obtained for five cents each, by addressing the "Commissioner of Patents, Washington, D. C."